Patented June 12, 1945

2,378,015

UNITED STATES PATENT OFFICE 2,378,015

POLYVINYL ETHERS OF BETA GUANYL-
ETHANOLS

Ray Clyde Houtz, Snyder, N. Y., assignor to E. I.
du Pont de Nemours & Company, Wilmington,
Del., a corporation of Delaware No Drawing. Application March 27, 1943,
Serial No. 480,845

13 Claims. (Cl. 260—90)

This invention relates to new polymeric products, and more particularly to a new type of polyamidine (guanyl compound).

This invention has as an object the preparation of new basic polymeric materials. Another object is the preparation of new wetting agents. Other objects will appear hereinafter.

These objects are accomplished by the following invention of polyvinyl ethers of beta-hydroxypropionamidines (beta-guanylethanols) and salts thereof and the preparation of the salts from polyvinyl beta-cyanoethyl ethers by reacting the same with an anhydrous alcohol and a strong, preferably non-oxidizing, inorganic acid followed by reaction with ammonia or a monoamine having at least one amino hydrogen. The free amidines may be obtained by treatment of the salt with aqueous alkali.

For simplicity in nomenclature the compounds obtained may also be referred to as polyvinyl ethers of beta-guanylethanols.

In preparing the imino ether salt of a polyvinyl beta-cyanoethyl ether the latter is dissolved in a suitable solvent such as anhydrous methyl acetate. The two liquid layers which form become a single layer when an amount of anhydrous alcohol 50% in excess of that required to react with the nitrile group is added. The solution is cooled to 0° C. and an amount of dry hydrogen chloride 10% in excess of that equivalent to the nitrile groups present, is added during a period of about 45 min. The resulting clear solution is stored at a temperature of about 5° C. In about three hours the imino-ether hydrochloride begins to separate as an oil which after another 16 hours at 5° C. becomes a tough rubbery precipitate. After decanting the methyl acetate, the polymer is rinsed several times with anhydrous ether and dried at low temperature in a vacuum over phosphorus pentoxide.

The imino-ether hydrochloride, which is hygroscopic and unstable at elevated temperatures, is converted to an amidine by dissolving the same in a suitable solvent such as anhydrous methanol and adding, with thorough mixing, an excess (10%) of a primary or secondary amine or ammonia. The solution is allowed to react at room temperature for 16–44 hours. The solvent is then removed by distillation under reduced pressure, leaving a thick syrupy or taffy-like polymeric product which is rinsed several times with anhydrous ether and dried at reduced pressure over phosphorus pentoxide. The resulting polyvinyloxypropionamidine salt, N-substituted or unsubstituted, is water- and alcohol-soluble.

The parent amidine base is obtained by treatment of the salt with aqueous alkali. The free base is soluble in ether but insoluble in the alkaline solution.

The more detailed practice of the invention is illustrated by the following examples wherein parts given are by weight. There are, of course, many forms of the invention other than these specific embodiments.

*Example I.—Polyvinyl ether of methyl 3-hydroxypropionimidate hydrochloride*

Forty-nine parts of polyvinyl beta-cyanoethyl ether was dissolved in 280 parts of anhydrous methyl acetate. The small amount of insoluble material which remained was removed by centrifuging, whereupon two layers formed, which became a homogenous solution upon the addition of 24 parts (50% excess) of absolute methanol. The solution was cooled to 0° C., and 20 parts of dry hydrogen chloride was run in during a period of 45 minutes. The resulting clear, straw-yellow colored solution was then stored at a temperature of 5° C. and within 3 hours the insoluble imino-ether hydrochloride began to separate out as an oil which overnight became a tough rubbery precipitate. After decanting the methyl acetate, the polymer was rinsed several times with anhydrous ether and dried in a vacuum over phosphorus pentoxide. A yield of 73 parts (88% of the theoretical) of a pink, hygroscopic material was obtained. It was soluble in water (but the amide precipitated upon standing for a few minutes), methanol and ethanol, and was insoluble in ether, methyl acetate, ethyl acetate, dioxane, benzene, and toluene. This product was used immediately after synthesis for the subsequent conversion to amidine.

*Example II.—Polyvinyl ether of methyl 3-hydroxypropionimidate hydrochloride*

To a solution of 24 parts of polyvinyl beta-cyano-ethyl ether in 100 parts of acetone, cooled to 0–5° C., was added slowly, with vigorous stirring, 18 parts (100% excess) of dry hydrogen chloride. After the addition of the hydrogen chloride was complete, 16 parts (100% excess) of absolute methanol was added and the reaction mixture was then stored at 0–5° C. for 2 days at which time the reaction mixture was dark red-brown in color. The iminoether hydrochloride isolated from this reaction mixture was soluble in water.

*Example III.—Polyvinyl ether of 3-hydroxypropionamidine hydrochloride*

Seventeen parts of the polyvinyl ether of methyl 3-hydroxypropionimidate hydrochloride (prepared as described in Example I) was dissolved in a solution of 8.5 parts of anhydrous ammonia in 91.5 parts of absolute alcohol at room temperature (about 25° C.) and allowed to stand at this temperature for 16–20 hours. The alcohol was evaporated from the reaction mixture and the residue washed with several portion of anhydrous ether and dried in a vacuum over phosphorus pentoxide. Twelve and five-tenths parts (83% of the theoretical) of a light peach colored product was obtained. It was soluble in water and alcohols and in aqueous sodium hydroxide.

*Example IV.—Polyvinyl ether of 3-hydroxy-N-butyl-propionamidine hydrochloride*

A solution of 12 parts of polyvinyl ether of methyl 3-hydroxypropionimidate hydrochloride in 79 parts of absolute methanol was mixed thoroughly at room temperature with a solution of 6 parts of normal butylamine in 40 parts of absolute methanol. The reaction mixture was allowed to stand at room temperature for 16–20 hours and then the methanol was removed under reduced pressure at a temperature not higher than 55° C. A syrup-like product was obtained which was washed several times with anhydrous ether and dried in a vacuum over phosphorus pentoxide. The product was a pink hygroscopic polymer amounting to 13 parts (87% of theoretical) which was soluble in alcohol and water. Treatment of this amidine salt with aqueous sodium hydroxide solution precipitated the basic amidine which was soluble in ether.

*Example V.—Polyvinyl ether of 3-hydroxy-N-dodecyl-propionamidine hydrochloride*

A solution of 17 parts of the polyvinyl ether of methyl 3-hydroxypropionimidate hydrochloride in 40 parts of absolute methanol was mixed thoroughly with 21 parts of n-dodecylamine in 40 parts of absolute methanol and allowed to stand at room temperature for 16–20 hours. From this reaction mixture there was isolated by the procedure used in the preceding example 27 parts of a slightly orange colored product which was soluble in water and methanol but insoluble in ether. Treatment of the amidine hydrochloride with aqueous alkali precipitated the free amidine base (guanylalkanol ether).

The polyvinyl beta-cyanoethyl ethers employed may be prepared by the process of my copending application Serial No. 463,847, filed October 29, 1942, the disclosure of which is hereby incorporated herein, and include not only the beta-cyanoethyl ethers of homopolymeric vinyl alcohol but also copolymers thereof containing the polyvinyl alcohol group

copolymerized with other groups, for example, polyvinyl compounds made by hydrolyzing copolymers of vinyl esters, e. g., vinyl acetate, with other compounds capable of polymerizing with vinyl esters. Such polyvinyl resins containing a plurality of the groups —CH(OH)CH₂— and other groups, which for convenience are designated as polyvinyl alcohol copolymers, include, for example, copolymers of: acrylic acid, alkyl substituted acrylic acids, e. g., methacrylic acid, and their esters, nitriles, and amides, e. g., methyl methacrylate, acrylonitrile, and acrylamide; vinyl aryls such as styrene; other vinyl esters, e. g., vinyl chloride and vinyl chloroacetate, and the like. In short, any polyvinyl compound containing a plurality of free hydroxyl groups, with or without combined hydroxyl groups or other groups, may be reacted with vinyl cyanide in accordance with the process of my said copending application to obtain the polyvinyl beta-cyanoethyl ethers employed in the process of the present application.

These polyvinyl beta-cyanoethyl ethers whether derived from homopolymeric polyvinyl alcohol or copolymers thereof are characterized by the presence of recurring units of the formula

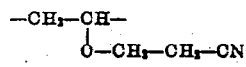

and the amidine salts derived therefrom, i. e., the polyvinyl ethers of beta-guanyl ethanols are all polymers having a plurality of recurring units of the formula

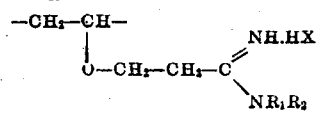

wherein X is the non proton radical of a mineral acid of ionization constant of at least $1\times10^{-5}$ at 25° C. and $R_1$ and $R_2$ are hydrogen or monovalent hydrocarbon radicals, preferably alkyl, and which amidine salts may be converted to the corresponding amidines by treatment with an alkali.

While in the first step of the present process, the formation of the imino-ether from the cyanoether, any alcohol may be employed, longer reaction times are needed with alkanols of more than two carbons than is the case when an alkanol of up to two carbon atoms, i. e., methanol or ethanol, is employed. The latter are therefore preferred.

The examples disclose the use of hydrogen chloride, but any anhydrous strong, i. e., of ionization constant of at least $1\times10^{-5}$ at 25° C., preferably non-oxidizing, mineral acid may be employed including hydrogen bromide, sulfuric acid, phosphoric acid, etc.

The relative amounts of ingredients employed may be those of stoichiometric equivalents. However, it is preferred to use a slight excess of alcohol and inorganic acid in order to obtain complete reaction of the polyvinyl alcohol. The diluent for this step of the reaction may be any inert liquid which dissolves the starting materials at least partially, and which does not react with any of the starting materials. The preferred diluents are methyl acetate and acetone, although others may be used.

The temperature at which the reaction is conducted is maintained sufficiently low to avoid decomposition of the iminoether salt. Thus, it is necessary to operate below 120° C. and preferably at about 0–5° C. The reaction may be carried out at subatmospheric, atmospheric, or superatmospheric pressure.

In the second step of the process, the conversion of the iminoether salt to the amidine salt, the examples illustrate the use of ammonia and two primary amines.

However, any ammonia type compound having at least one hydrogen on ammonia type nitrogen and only one nitrogen atom the valences of which not satisfied by hydrogen atoms are satisfied by monovalent hydrocarbon radicals, preferably aliphatic and preferably saturated, may be employed, including ammonia, saturated amines, e. g., n-butylamine, n-dodecylamine, methylamine, dimethylamine, n-propylamine, and n-amylamine; unsaturated amines, e. g., allylamine; and aromatic amines, e. g., aniline and methylaniline. Primary alkylamines are the preferred amines. Primary amines are preferred to secondary amines since the reaction with the latter is slower. In the second step the diluent effects a homogenous solution of the reactants and should, therefore, dissolve the reactants at least to a slight extent and should be inert to them. The preferred solvents are the lower aliphatic alcohols such as methanol and ethanol. A slight excess (10-25%) of amine over that chemically equivalent to the iminoether salt which is used is advantageous in obtaining more complete reaction of the polyvinyl iminoether.

The temperature at which the second stage of the reaction is conducted is maintained sufficiently low to avoid decomposition of the iminoether salt. Thus, it is necessary to operate below 120° C. and preferably at 20-30° C. Any temperature below 50° C. is satisfactory as long as it is sufficient to allow reaction to take place. The reaction may be carried out at subatmospheric, atmospheric, or superatmospheric pressure.

The products of this invention are useful as wetting agents. The process of this invention is useful as a means of preparation of hitherto unknown compositions of matter.

The above description and examples are intended to be illustrative only. Any modification of or variation therefrom which conforms to the spirit of the invention is intended to be included within the scope of the claims.

What is claimed is:

1. A process for the preparation of the polyvinylether of beta-guanylethanol which comprises reacting polyvinyl beta-cyanoethyl ether in anhydrous methyl acetate at 0° C. with anhydrous methanol and hydrogen chloride, isolating the resulting polyvinyl ether of methyl 3-hydroxypropionimidate hydrochloride and reacting the same at 25° C. with anhydrous ammonia in absolute ethanol.

2. A process for the preparation of the polyvinylether of beta-guanylethanol which comprises reacting polyvinyl beta-cyanoethyl ether in an anhydrous inert diluent at 0-5° C. with hydrogen chloride and an anhydrous alkanol of up to two carbon atoms and reacting the resulting polyvinyl ether of the alkyl 3-hydroxypropionimidate hydrochloride at 20-30° C. with anhydrous ammonia.

3. A process for the preparation of polyvinyl ethers of beta-guanylethanols which comprises reacting at a temperature below the decomposition temperature and below 120° C. a polyvinyl betacyanoethyl ether in an anhydrous inert diluent with an alcohol of up to two carbon atoms and a strong mineral acid and reacting the resulting imino ether with a tervalent nitrogen compound having the one nitrogen atom attached to at least one hydrogen atom, the valences of said nitrogen atom not satisfied by hydrogen being satisfied by alkyl.

4. A process for the preparation of the polyvinyl ether of a beta-guanylethanol which comprises reacting at a temperature below the decomposition temperature and below 120° C. polyvinyl betacyanoethyl ether in an anhydrous diluent with an alcohol of up to two carbon atoms and a strong mineral acid and reacting the resulting imino ether with, a tervalent nitrogen compound having the one nitrogen atom attached to at least one hydrogen atom, the valences of said nitrogen atom not satisfied by hydrogen being satisfied by alkyl.

5. In a process for the preparation of the polyvinyl ether of a beta-guanylethanol the step which comprises reacting at a temperature below the decomposition temperature and below 120° C. the polyvinyl ether of a 3-hydroxypropionimidate ether of an alkanol of up to two carbon atoms with a tervalent nitrogen compound having one basic nitrogen atom to which is attached at least one hydrogen atom the valences of said nitrogen not satisfied by hydrogen being satisfied by monovalent hydrocarbon radicals.

6. Process of claim 5 wherein the tervalent nitrogen compound is a primary alkylamine.

7. Process of claim 5 wherein the ether is reacted with ammonia.

8. An ether of a polyvinyl alcohol with a beta-guanylethanol wherein the valences of the nitrogens not satisfied by hydrogen, the anion, and the guanyl carbon are satisfied by monovalent hydrocarbon radicals.

9. An ether of polyvinyl alcohol with a beta-guanylethanol wherein the valences of the nitrogens not satisfied by hydrogen, the anion, and the guanyl carbon are satisfied by monovalent hydrocarbon radicals.

10. The polyvinyl ether of beta-guanylethanol.

11. The polyvinyl ether of N-butyl-beta-guanylethanol.

12. The polyvinyl ether of N-dodecyl-beta-guanylethanol.

13. The polyvinyl ether of an N-alkyl-beta-guanylethanol.

RAY CLYDE HOUTZ.